(12) United States Patent
Jung et al.

(10) Patent No.: US 12,551,967 B2
(45) Date of Patent: Feb. 17, 2026

(54) RESISTANCE SPOT WELDING CONTROL SYSTEM AND METHOD THEREOF

(71) Applicants: OBARA KOREA CORPORATION, Gyeonggi-do (KR); TESSONICS INC., Windsor (CA)

(72) Inventors: Sung Hoon Jung, Gyeonggi-do (KR); Yang Woo Noh, Gyeonggi-do (KR); Sanghyun Yoo, Gyeonggi-do (KR); Si Eun Kim, Chungcheongnam-do (KR); Roman Gr. Maev, Windsor (CA); Andriy M. Chertov, Windsor (CA); Donald Ryan Scott, Windsor (CA); Danilo Stocco, Windsor (CA)

(73) Assignees: Obara Korea Corporation, Gyeonggi-do (KR); Tessonics Inc., Windsor, CA (US)

( * ) Notice: Subject to any disclaimer, the term of this patent is extended or adjusted under 35 U.S.C. 154(b) by 886 days.

(21) Appl. No.: 17/791,573

(22) PCT Filed: Sep. 22, 2020

(86) PCT No.: PCT/KR2020/012740
§ 371 (c)(1),
(2) Date: Jul. 8, 2022

(87) PCT Pub. No.: WO2021/153874
PCT Pub. Date: Aug. 5, 2021

(65) Prior Publication Data
US 2023/0030196 A1    Feb. 2, 2023

(30) Foreign Application Priority Data

Jan. 28, 2020    (KR) .................. 10-2020-0009835

(51) Int. Cl.
*B23K 11/25*    (2006.01)
*B23K 11/11*    (2006.01)

(52) U.S. Cl.
CPC .............. *B23K 11/25* (2013.01); *B23K 11/11* (2013.01)

(58) Field of Classification Search
CPC ....... B23K 11/11; B23K 11/115; B23K 11/25; B23K 2101/006; B23K 31/125
(Continued)

(56) References Cited

U.S. PATENT DOCUMENTS 5,920,014 A  *  7/1999  Waschkies ........... G01N 29/326
                                                        73/602
2005/0263496 A1*  12/2005  Kobayashi .............. B23K 11/11
                                                        219/86.25
(Continued)

FOREIGN PATENT DOCUMENTS

CN        110726773      *  1/2020
JP        S55-98486 U1    7/1980
(Continued)

*Primary Examiner* — Ibrahime A Abraham
*Assistant Examiner* — Joseph W Iskra
(74) *Attorney, Agent, or Firm* — Dilworth & Barrese, LLP

(57) ABSTRACT

A system for resistance spot welding control and a method thereof are disclosed.
A system for regulating welding parameters of a spot welding machine joining a plurality of panels according to an aspect of the present disclosure includes an ultrasonic sensor installed inside an electrode of a welding gun, applying a ultrasonic wave to a welding part of the panel, and detecting a reflected ultrasonic signal; an ultrasonic analyzer capable of creating ultrasonic analysis information by analyzing in real time the ultrasonic signal; and a welding controller receiving the ultrasonic analysis information from the ultrasonic analyzer, performing adaptive welding control (Continued)

with the welding parameters set based on information of the panel, and compensating in real time one or more welding parameters according to the received ultrasonic analysis information.

19 Claims, 8 Drawing Sheets

(58) Field of Classification Search
USPC .................................................... 219/86.1
See application file for complete search history.

(56) References Cited

U.S. PATENT DOCUMENTS

2006/0076321 A1 4/2006 Maev et al.
2013/0337284 A1 12/2013 Onda et al.

FOREIGN PATENT DOCUMENTS

| | | | |
|---|---|---|---|
| JP | S64-27785 | A | 1/1989 |
| JP | H1-224176 | A | 9/1989 |
| JP | H4-22584 | A | 1/1992 |
| JP | 2005-169505 | A | 6/2005 |
| JP | 2005-334945 | A | 12/2005 |
| JP | 2006-864 | A | 1/2006 |
| JP | 2006-95542 | A | 4/2006 |
| JP | 2011-73034 | A | 4/2011 |
| JP | 2011-200868 | A | 10/2011 |
| JP | 2012-183550 | A | 9/2012 |
| JP | 2013-36743 | A | 2/2013 |
| JP | 2013-215748 | A | 10/2013 |
| JP | 2014-176872 | A | 9/2014 |
| JP | 2014176872 | * | 9/2014 |
| JP | 6126174 | B2 | 5/2017 |
| KR | 10-2018-0130173 | A | 12/2018 |
| KR | 10-2019204 | B1 | 9/2019 |
| KR | 10-2020-0007960 | A | 1/2020 |

* cited by examiner

FIG. 6

<Base welding controller value>

| Welding condition | Setting value (example) | Explaining |
|---|---|---|
| Base current | 7.0kA | Welding start current |
| Base current increasing rate | 10% | Rate for increasing base current |
| Current increasing start time | 30ms | Time for starting current increasing |
| Current increasing end time | 160ms | Maximum current increasing time when value α is not received |
| Base welding time | 200ms | Minimum welding time |
| Maximum welding time | 300ms | Limitation setting to prevent damage of welding panel due to excessing heat amount |
| Time increasing start time | 30ms | Time for determining lowest time increasing rate |
| Time increasing end time | 160ms | Time for determining maximum time increasing rate when SSID is not received |

<Ultrasonic wave analyzer receipt information>

| Receipt information | Receipt information (example) | Explain |
|---|---|---|
| SSID | 90ms | Factor value for determining final welding time |
| α | 140ms | Factor value for determining maximum current |

RESISTANCE SPOT WELDING CONTROL SYSTEM AND METHOD THEREOF

TECHNICAL FIELD

The present disclosure relates to a resistance spot welding control system and a method thereof. More particularly, the present disclosure relates to a control system for regulating welding parameters of a resistance spot welding machine which joins a plurality of metal panels and method thereof.

BACKGROUND

In general, a welding robot is used in a vehicle factory for joining a plurality of members (hereinafter, it will be referred to as panels) to form a vehicle body with resistance spot welding. Resistance spot welding (hereinafter, it will be referred to as spot welding) is a method in which two electrodes, attached to both ends of a welding gun, are clamped to overlapped metal panels, and a high-pressure current are applied to the overlapped metal panels with pressure. A localized melting spot occurs due to electrical contact resistance between the metal panels. Because the spot welding is usually performed thousands of times per vehicle in the vehicle factory, quality of the spot welding is recognized as a significant factor in deciding crash safety of a vehicle's body structure.

In general, panels of various materials and thickness are used for a vehicle's body, including a roof, a pillar, a side panel, and an opening flange of a door, requiring a series of different weld schedules and adjustments enabled by a welding controller. Conventionally, the spot welding control is performed by applying a predetermined time and current in joining the panels of different geometric features.

A conventional welding controller may not be capable of dealing with even the slightest variation in strength and physical properties of mass-produced panels caused by changes in a batch, stamping, and contact conditions of joints. This may lead potential defects in a finished product.

Therefore, manufacturing of good quality products requires a method of adaptive welding control based on monitoring of the variations in spot welding parameters.

The above information disclosed in this Background section is only for the enhancement of understanding the background of the invention and therefore it may contain information that does not form the prior art that is already known in this country to a person of ordinary skills in the art.

DETAILED DESCRIPTION OF THE INVENTION

Technical Object

Exemplary embodiments of the present disclosure are to provide an adaptive resistance spot welding control system and a method thereof which are capable of controlling a welding time and current of a welding gun based on ultrasonic monitoring of spot welding operation in real time.

Means for Achieving Object

According to an aspect of the present disclosure, a system for regulating welding parameters of a spot welding machine joining a plurality of panels includes an ultrasonic sensor installed inside an electrode of a welding gun, applying a ultrasonic wave to a welding part of the panel, and detecting a reflected ultrasonic signal; an ultrasonic analyzer capable of creating ultrasonic analysis information by analyzing in real time the ultrasonic signal; and a welding controller receiving the ultrasonic analysis information from the ultrasonic analyzer, performing adaptive welding control with the welding parameters set based on information of the panel, and compensating in real time one or more welding parameters according to the received ultrasonic analysis information.

In addition, the ultrasonic analyzer may generate the ultrasonic wave with a frequency band selected based on the information of the panel received from the welding controller in order to perform ultrasonic analysis on the welding part.

In addition, the ultrasonic analyzer may detect at least one of a steel to steel interface (SSI), a steel to steel interface disappearance (SSID), a welding heat of a welding part ($\alpha$), a liquid penetration depth (LPD), and an end of melting (EOM) as the ultrasonic analysis information based on the ultrasonic signal transmitted in real time.

In addition, the ultrasonic analyzer may generate an ultrasonic image, perform the ultrasonic analysis from a welding start time to a welding end time so as to obtain the ultrasonic analysis information, and transmit the obtained ultrasonic analysis information to the welding controller.

In addition, the welding parameters may include a welding time and a current.

In addition, the welding controller controls a compensation of the welding time and the current with factors of the ultrasonic analysis information which is sequentially analyzed so as to ensure welding quality.

In addition, the welding controller may include a communication module for communicating with a manufacturing execution system server, which centrally manages the ultrasonic analyzer and welding operation through a multi-channel communication interface; an information collection module analyzing a message type and a receiving time of the ultrasonic analysis information received by the ultrasonic analyzer; a timer module for performing time division-based counting in milliseconds (ms) during the welding operation; a current conversion module of converting the current for the spot welding according to a signal applied; a storage module storing at least one program and setting data for welding control and storing information generated according to the welding operation; and a control module obtaining the information of the loaded panel, transmitting the information of the loaded panel to the ultrasonic analyzer, setting the welding parameters according to the information of the panel, and then starting the welding operation.

In addition, the information collection module may transmit to the control module the receiving time of the ultrasonic analysis information, time-divided in milliseconds (ms), from the welding start time to the welding end time.

In addition, the setting data may include a location information of a spot weld and base welding control parameters, which are set variably for materials and thickness of the panels according to a serial information of the panels.

In addition, the control module is capable of storing a kinematic position control information for the welding operation of a robot equipped with the welding gun, and controlling motion and operation of the welding gun through a position control of the robot according to each set operation.

In addition, the control module is capable of setting the welding parameters, which include a base current at the welding start time, a base current increase rate, a current increase start time, a current increase end time, a base welding time at the welding start time, a maximum welding time, a time increase start time, and a time increase end time.

In addition, the control module determines a total welding time based on the base welding time, the time increase rate at a time of receiving the SSID, and the information of the panel.

In addition, the control module may limit a current increase according to the α of the received ultrasonic analysis information, and stop the welding operation upon reaching the total welding time.

In addition, the control module may stop current supply when the LPD received from the ultrasonic analyzer meets a reference size according to the information of the panel.

In addition, the control module may terminate the welding by releasing a welding force of the electrode acting on the panel when the EOM is received by the ultrasonic analyzer.

Meanwhile, a welding control method for joining a plurality of panels with a welding control system of a spot welding machine according to an aspect of the present disclosure, includes step (a) for setting base welding parameters matched with a serial information of a loaded panel and starting a welding based on the set base welding parameters; step (b) for monitoring an ultrasonic analysis information in real time by using an ultrasonic sensor installed inside an electrode of a welding gun; step (c) for starting to increase a current according to a set base current increase rate upon reaching a predetermined current increase start time from a welding start time; step (d) for identifying a time increase rate, which corresponds to a time of receiving a steel to steel interface disappearance (SSID) as the ultrasonic analysis information, and for determining a final welding time based on the set base welding time and the time increase rate; and step (e) for limiting the current increase when a welding heat of a welding part (α), received as the ultrasonic analysis information, reaches a predetermined threshold angle and for maintaining a present current as a maximum current for a remaining welding time before terminating the welding.

In addition, the step (b) may include a step for transmitting the serial information to an ultrasonic analyzer upon starting the welding in order to synchronize an ultrasonic wave generation time, and for generating an ultrasonic wave with a frequency band corresponding to an information of the panel.

In addition, the step (e) may include a step for calculating the remaining welding time based on the final welding time and a receiving time of the α.

In addition, the step (e) may include a step for terminating the current supply to the welding gun based on a determination that a liquid penetration depth (LPD), received as the ultrasonic analysis information, meets a welding quality requirement; and a step for releasing a welding force of the electrode acting on the panel upon receiving an end of melting (EOM) as the ultrasonic analysis information in order to terminate the welding.

In addition, after the step (e), the welding control method may further include a step for receiving an ultrasonic image analyzed according to the welding control from the ultrasonic analyzer, for matching the ultrasonic analysis information with an ultrasonic adaptive control information to build a database, and for verifying the welding quality.

Effect of the Invention

An exemplary embodiment of the present disclosure may prevent defective welding by receiving in real time an ultrasonic analysis information on a welding part during welding operation and compensating a welding time and a current using an adaptive control algorithm, and thus may manufacture products with reliable welding quality.

In addition, an exemplary embodiment of the present disclosure may prevent occurrence of spatter by limiting an excessive current increase with ultrasonic monitoring of a, which represents a heat generation of a panel.

BRIEF DESCRIPTION OF THE DRAWINGS

FIG. 6 shows an example of base welding control parameters and ultrasonic analysis information received by an ultrasonic analyzer according to an exemplary embodiment of the present disclosure.

DETAILS FOR EXECUTING THE INVENTION

Figure 1:
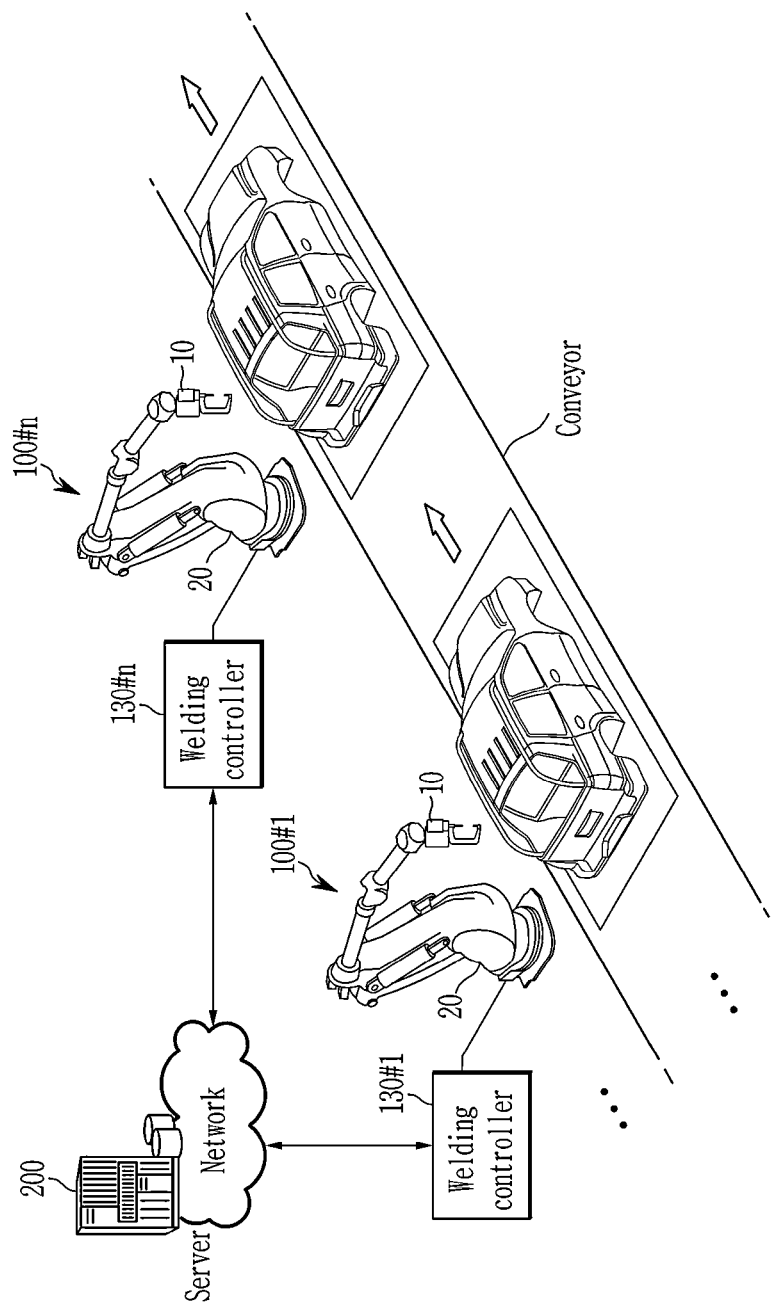
FIG. 1 shows an example of a line system to which a welding control system is applied according to an exemplary embodiment of the present disclosure.

The present disclosure will be described more fully hereinafter with reference to the accompanying drawings, in which exemplary embodiments of the disclosure are shown to those who are skilled in the art. However, the present disclosure may be embodied in many different forms, and should not be construed as being limited to the embodiments set forth herein. Accordingly, the drawings and descriptions are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements, but not the exclusion of any other elements. In addition, the terms "-er", "-or", and "module" described in the specification mean units for processing at least one function and operation, and can be implemented by hardware components or software components and combinations thereof.

Throughout the specification, the terms such as the first, the second, A, B, (a), (b), etc. may be used to describe various elements, but the elements should not be limited by such terms. These terms are only used to distinguish the elements from other elements, and thus the nature, order, or sequence of the elements is not limited by the terms.

Also, in this specification, it is to be understood that when one component is referred to as being "connected" or "coupled" to another component, it may be connected or coupled directly to the other component or be connected or coupled to the component with another component intervening therebetween. On the other hand, in this specification, it is to be understood that when one component is referred to as being "connected or coupled directly" to another component, it may be connected or coupled to the other component without another component intervening therebetween.

Throughout the specification, unless defined otherwise herein, all terms including technical or scientific terms have the same meanings as commonly understood by those skilled in the technical field to which the present disclosure belongs. Terms defined in a commonly used dictionary should be construed as being consistent with meanings in the context of the technical field and, unless explicitly defined otherwise herein, should not be interpreted as an ideal or excessively formal meaning.

A welding control system and a method thereof according to an exemplary embodiment of the present disclosure will hereinafter be described in detail with reference to the drawings.

FIG. 1 shows an example of a line system to which a welding control system is applied according to an exemplary embodiment of the present disclosure.

Referring to FIG. 1, several articulated welding robots 20 are arranged in a production line of a vehicle factory to assemble a product, and a welding gun 10 for spot welding is installed at a front end of an arm of each welding robot 20.

A server 200 allocates to a welding control system 100 information of a vehicle body transferred by a conveyor, a vehicle specification information corresponding to the vehicle body information, and task information of each welding robot corresponding to the vehicle specification information, and centrally controls processes in the production line.

The welding control system 100 is a system for controlling the spot welding of the welding robot 20 and includes a welding controller 130 as a major element.

The welding controller 130 automatically performs welding on a plurality of spot welds in alignment with the server 200 of a manufacturing execution system that centrally manages the processes in the factory. The welding controller 130 automatically moves the welding gun 10 to the spot welds by controlling a posture of the articulated welding robot 20 according to the task information set by the server 200, and then controls the spot welding according to an adaptive control algorithm.

Here, the adaptive control algorithm refers to compensation of a time and a current, which are main factors of spot welding control, according to welding status. For example, the welding controller 130 may compensate welding control conditions by receiving the time and the current as feedback from a sensor if a loaded panel during the welding is thicker or thinner compared to a reference value.

However, even with the panels of the same material and thickness, there is a limit to the adaptive control due to variations in strength or physical properties depending on manufacturers or production quantity, and therefore more accurate adaptive control requires additional information.

Therefore, a configuration of an improved welding control system according to an exemplary embodiment of the present disclosure will hereinafter be described in detail with reference to FIG. 2.

Figure 2:
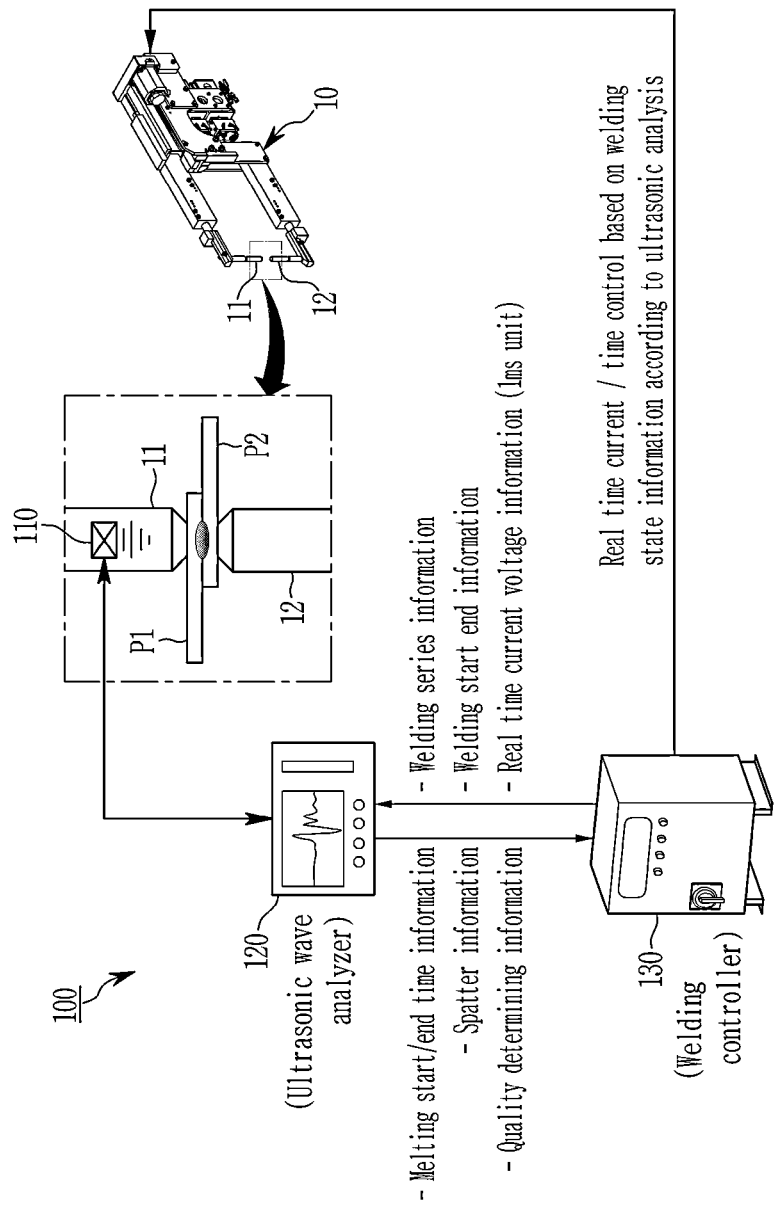
FIG. 2 shows briefly a configuration of a welding control system according to an exemplary embodiment of the present disclosure.

FIG. 2 shows briefly a configuration of a welding control system according to an exemplary embodiment of the present disclosure.

Referring to FIG. 2, the welding control system 100 according to the exemplary embodiment of the present disclosure includes an ultrasonic sensor 110, an ultrasonic analyzer 120, and the welding controller 130.

The ultrasonic sensor 110 is installed inside an upper electrode 11 of the welding gun 10, applies ultrasonic waves to a welding part of the panels P1 and P2, and detects a reflected signal. In the following description, it is assumed that the ultrasonic sensor 110 is installed inside the upper electrode 11 of the welding gun 10, but an exemplary embodiment of the present disclosure is not limited thereto and thus, the ultrasonic sensor 110 may be installed inside a lower electrode 12. The ultrasonic sensor 110 may be installed on a C-type or X-type welding gun depending on the welding systems, but an exemplary embodiment of the present disclosure is not limited thereto. In addition, as the ultrasonic sensor 110 is installed inside the electrode, the ultrasonic sensor 110 supports a real-time monitoring of the welding status of a welding part during the welding after the welding gun 10 is moved.

The ultrasonic sensor 110 is capable of transmitting detected ultrasonic signals to the ultrasonic analyzer 120 in real time through wired or wireless communication means available for the welding gun 10.

The ultrasonic analyzer 120 includes the wired or wireless communication means for communicating with the ultrasonic sensor 110, and a communication means for interworking with the welding controller 130. In addition, the ultrasonic analyzer 120 may include an information communication device including at least one program, data, memory, input/output interface, and processor for ultrasonic analysis to be described later.

When serial information of the panels P1 and P2 is received from the welding controller 130, the ultrasonic analyzer 120 generates ultrasonic waves with a frequency band considering the material and the thickness of the panels in order to start ultrasonic analysis on the welding part. The serial information may be used as a unique identification information (ID) for specifying welding information and a part of a product (vehicle body) to which the panels are applied. The serial information may include at least one of material, thickness, manufacturer, and warehousing date, or may be matched with data having such information. The serial information is managed by the server 200 and shared with the welding control system 100 so that the serial information can be recognized via a barcode/tag upon loading.

The ultrasonic analyzer 120 performs sampling of the detected ultrasonic signals received from the ultrasonic sensor 110 and transmits to the welding controller 130 ultrasonic analysis information analyzed in real time on the welding part of the panels P1 and P2. Here, the ultrasonic analysis information may also be referred to as welding status information on the welding part collected during the spot welding. Real-time transmission timing of the ultrasonic analysis information (i.e., the welding status information) is considered important in supporting ultrasonic adaptive control performed in a short time by the welding controller 130.

Figure 3:
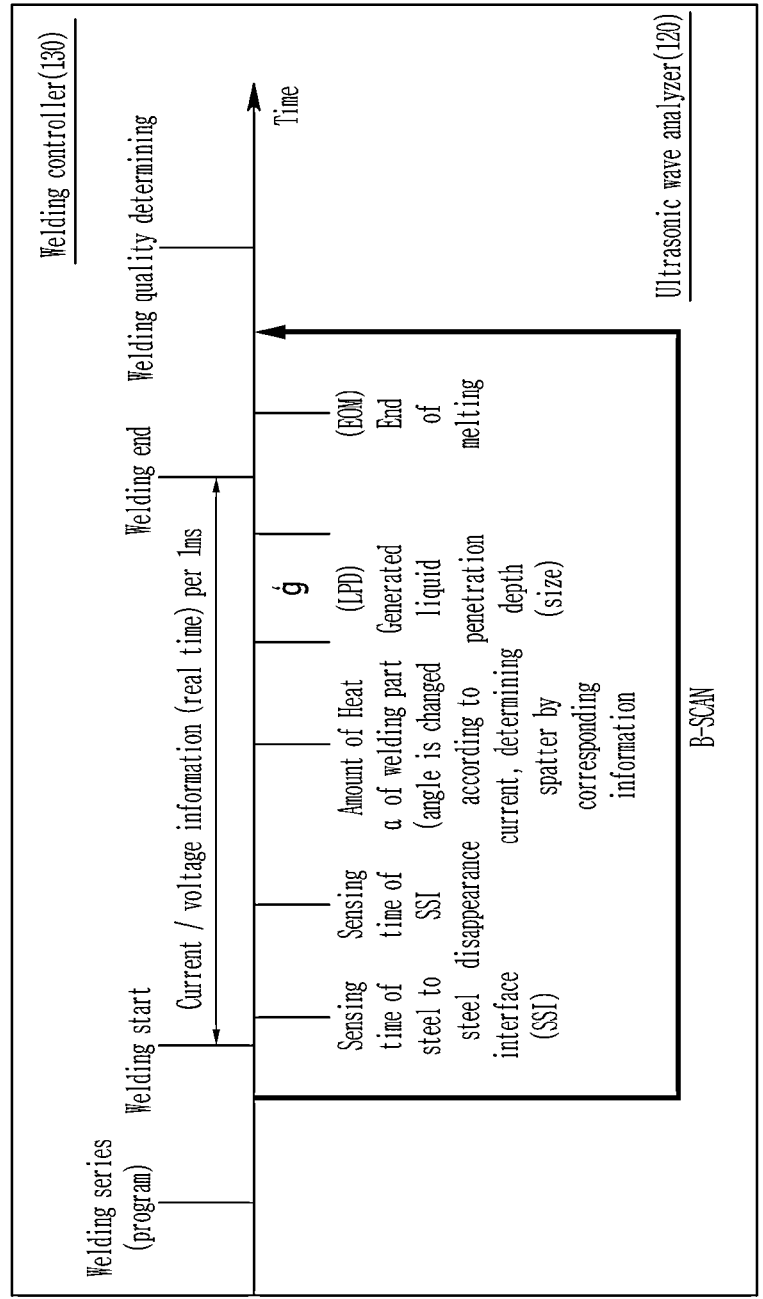
FIG. 3 is a diagram showing a timing of information exchange between an ultrasonic analyzer and a welding controller according to an exemplary embodiment of the present disclosure.

For example, FIG. 3 depicts an information exchange timing between the ultrasonic analyzer and the welding controller according to the exemplary embodiment of the present disclosure.

Figure 4:
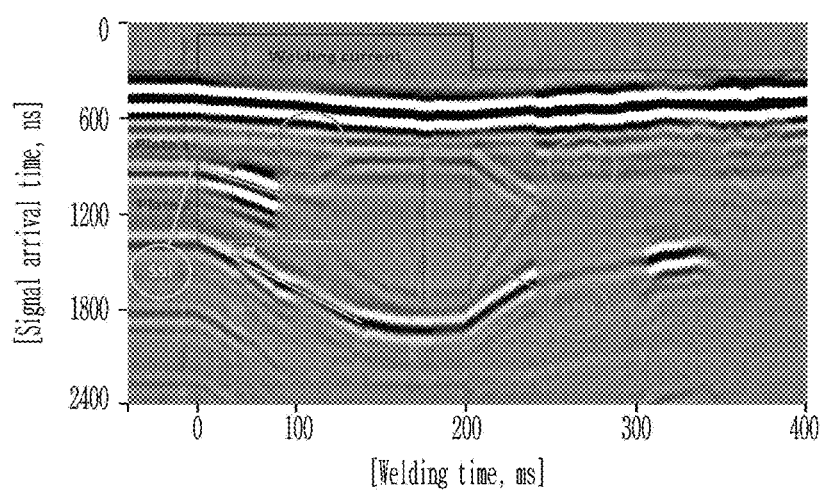
FIG. 4 shows B-SCAN information analyzed by an ultrasonic analyzer according to an exemplary embodiment of the present disclosure.

FIG. 4 shows B-SCAN information analyzed by the ultrasonic analyzer according to the exemplary embodiment of the present disclosure.

Referring to FIG. 3 and FIG. 4, the ultrasonic analyzer 120 is capable of detecting the ultrasonic analysis information, including at least one of a steel to steel interface (SSI), a steel to steel interface disappearance (SSID), a welding heat of the welding part (α), a liquid penetration depth (LPD), and an end of melting (EOM), in time series based on ultrasonic detecting signals and of transmitting the ultrasonic analysis information in real time.

For example, with reference to FIG. 4, the ultrasonic analysis information may have the following meanings.

The SSI refers to a point in time when a boundary line between the upper panel P1 and the lower panel P2 is detected by the ultrasonic waves. Here, an actual thickness of the upper panel P1 may be detected from the boundary line, which may be used to detect any difference between the actual thickness and the thickness based on the serial information of the panel. The serial information is information used for specifying the welding operation of the panel, and may include at least one of the unique identification information (ID), the material, the thickness, and the welding part, or may be matched with such information.

The SSID refers to a point in time when melting begins at the welding part and also a point of time when the disappearance of the SSI from the welded part is detected. The SSID may change flexibly depending on the material or the thickness of the panel. Therefore, the SSID may be used as a control factor in determining a final welding time.

The value of α refers to a tilt angle, which represents an amount of heat generated in the welding part depending on a current. Because the ultrasonic signals become slower as the amount of heat is higher, an increase in the value of α means an increase in the amount of heat. Therefore, the value of α may be used as a control factor for preventing occurrence of spatter by limiting an excessive current.

The LPD is a depth of a weld joint where a molten material is present and may be used to determine an interruption of a welding current and a welding time.

The end of melting (EOM) refers to a point in time when melting ends due to a decrease in welding heat caused by the interruption of the welding current, which may release a welding force of the electrodes 11 and 12 acting on the panel.

Meanwhile, the ultrasonic analyzer 120 generates an ultrasonic B-SCAN image and a corresponding analysis information from a welding start time to a welding end time, and is capable of transmitting the information and the B-SCAN image to the welding controller 130, which allows the welding controller 130 to determine a quality of the spot welding. In addition, it may be used as data for verifying/modifying adequacy by comparing it with information of the adaptive control implemented according to fine variations of the panels.

The welding controller 130 performs the adaptive welding control with base welding control values set according to the serial information of the panels. The ultrasonic analysis information is received from the ultrasonic analyzer 120 as additional information for compensating for the welding time and the current of the welding gun 10 in real time. For example, the compensation of the welding time and the current may be performed in 1 ms.

Figure 5:
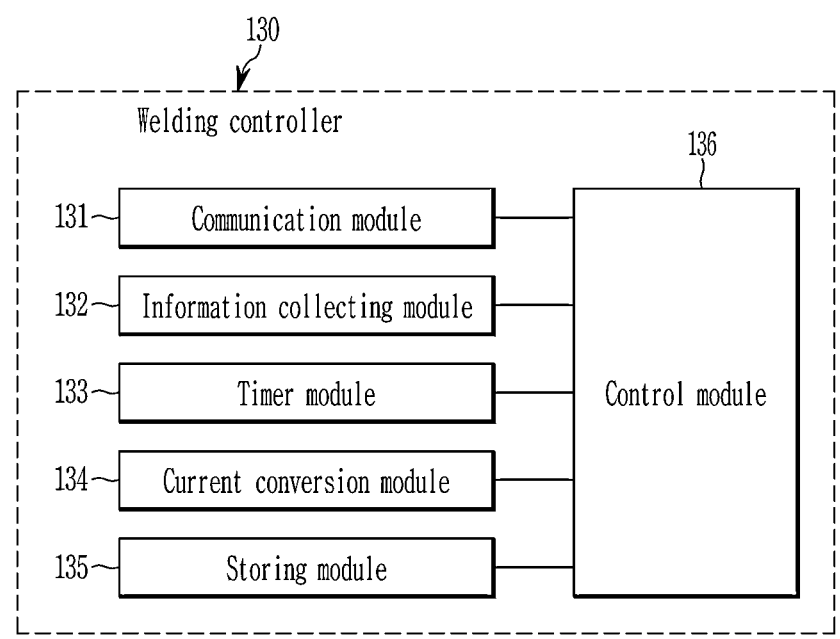
FIG. 5 is a schematic diagram showing a detailed configuration of a welding controller according to an exemplary embodiment of the present disclosure.

FIG. 5 is a schematic diagram showing a detailed configuration of a welding controller according to an exemplary embodiment of the present disclosure.

Referring to FIG. 5, the welding controller 130 according to the exemplary embodiment of the present disclosure includes a communication module 131, an information collection module 132, a timer module 133, a current conversion module 134, a storage module 135, and a control module 136.

The communication module 131 includes a multi-channel communication means and may communicate with the ultrasonic analyzer 120 and the server 200, respectively.

The information collection module 132 analyzes a message type and a receiving time of the ultrasonic analysis information from the ultrasonic analyzer 120 during the welding in order to transmit the analyzed data to the control module 136. In addition, the information collection module 132 may collect current/voltage values actually applied to the electrodes 11 and 12 of the welding gun 10 via a sensor during the welding and transmit such information to the control module 136.

The timer module 133 performs counting spot welding operation time of the welding gun 10 in milliseconds (ms). Therefore, the information collection module 132 can transmit to the control module 136 the receiving time of the ultrasonic analysis information, time-divided in milliseconds (ms), from the welding start time to the welding end time.

The current conversion module 134 generates the current for the spot welding and converts the welding current according to a signal applied by the control module 136.

The storage module 135 stores at least one program and setting data for the spot welding control according to the exemplary embodiment of the present disclosure and stores information generated during the welding operation. The setting data may include locations of the spot welds and the base welding control parameters, which are set variably for the materials and the thickness of the panels according to the serial information (ID) of the panel.

The control module 136 may comprise at least one processor that controls overall operations of the welding controller 130 for the welding control according to the exemplary embodiment of the present disclosure, and controls the welding gun 10 based on execution of the program and the setting data.

The control module 136 stores kinematic position control information for the welding operation of the welding robot 20, and controls movement and operation of the welding gun 10 through a position control of the welding robot 20 according to each set operation.

The control module 136 detects the serial information (ID) of the panel loaded by the conveyor, transmits the serial information (ID) to the ultrasonic analyzer 120, and sets the base welding control parameters according to the serial information in order to start the welding.

For example, FIG. 6 shows an example of the base welding control parameters and the ultrasonic analysis information received by the ultrasonic analyzer according to an exemplary embodiment of the present disclosure.

Figure 7:
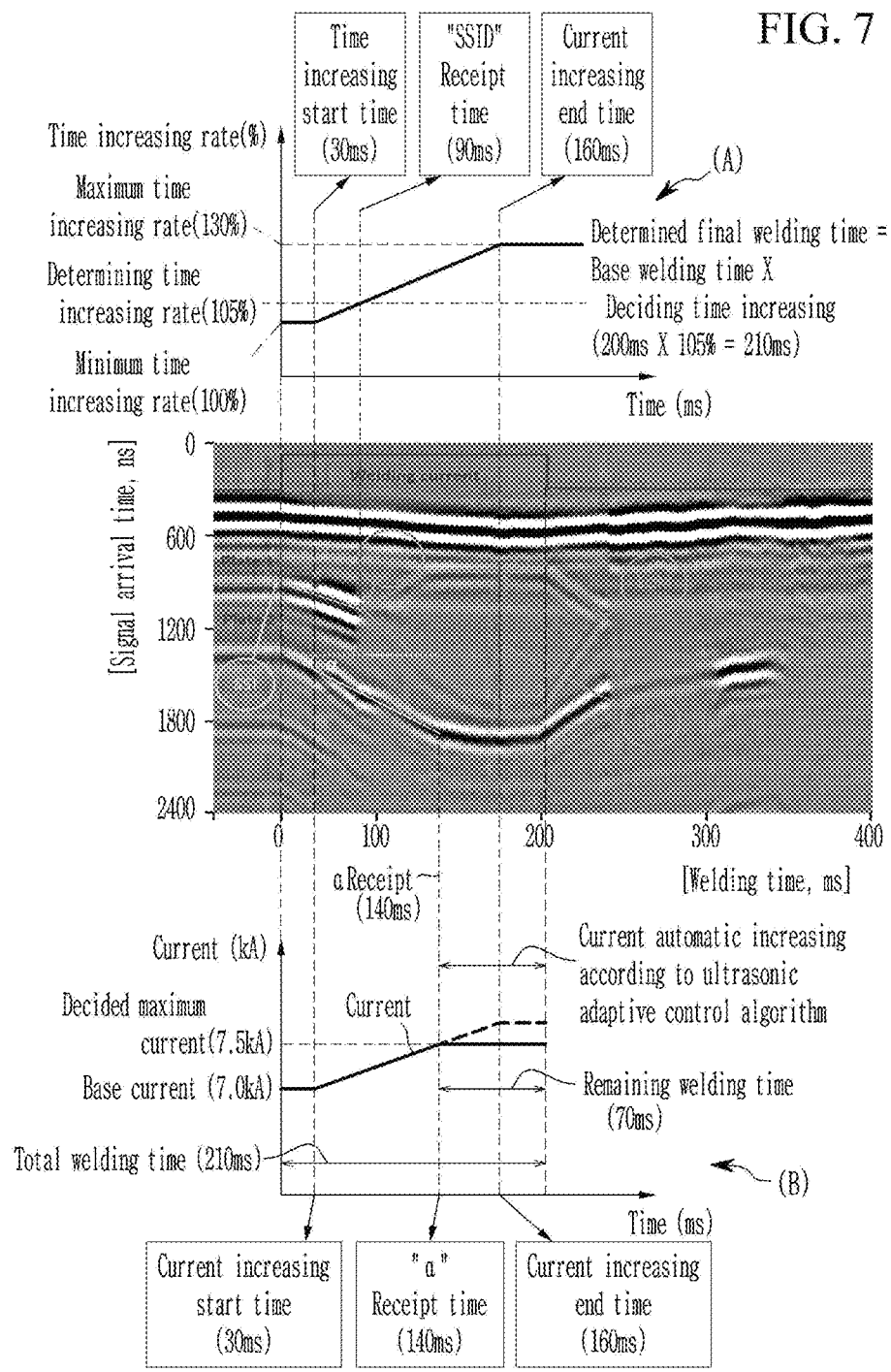
FIG. 7 shows an example of compensating a welding time and a current based on information received by an ultrasonic analyzer illustrated in FIG. 6.

In addition, FIG. 7 shows an example of compensating the welding time and the current based on the information received by the ultrasonic analyzer illustrated in FIG. 6.

Referring to FIG. 6 and FIG. 7, the control module 136 sets the base welding control parameters, including a base current at the welding start time, a base current increase rate, a current increase start time, a current increase end time, a base welding time, a maximum welding time, a time increase start time, and a time increase end time based on the serial information (ID) of the panel.

The control module 136 starts the welding with the set base current of 7.0 Ka when the welding is performed according to the base welding control parameters of a scenario illustrated above.

The control module 136 starts to increase the current by 10%, which is the set base current increase rate, after 30 ms from the welding start time.

At this time, upon receiving the SSID detected by the ultrasonic analyzer 120 during the welding, the control module 136 identifies a time increase rate (105%) at the time of receiving the SSID as depicted in FIG. 7, which shows a welding time control graph A. In addition, the control module 136 may determine the final welding time (210 ms) by multiplying the set base welding time (200 ms) by the time increase rate (105%) (200 ms*105%=210 ms).

As described above, the control module 136 performs an adaptive control algorithm to compensate for the welding time, which is increased from the set base welding time by the time increase rate detected at the time of receiving the SSID, thereby having an advantage of preventing defective welding.

In addition, when the α detected by the ultrasonic analyzer 120 is received, the control module 136 limits a current increase as depicted in FIG. 7, which shows a current control graph B, determines a present increased current as the maximum current, and applies the determined maximum current during a remaining welding time until the welding is terminated. At this time, the control module 136 may calculate the remaining welding time (70 ms) by subtracting a receiving time (140 ms) of the α from the final welding time (210 ms). In addition, the control module 136 may limit the current increase and determine the maximum current when the received α reaches a predetermined threshold angle.

As described above, the control module 136 performs the adaptive control algorithm that prevents generation of the spatter by limiting an excessive current increase according to the α detected by the ultrasonic analysis, thereby preventing contamination of product surfaces even without reaching the base current increase end time set according to the serial information.

In addition, the control module 136 may stop applying the welding current when the LPD, received from the ultrasonic analyzer 120, meets a reference size in consideration of the thickness of the panels.

In addition, the control module 136 may release the welding force of the electrodes 11 and 12 acting on the panels in order to terminate the welding operation when the EOM is received from the ultrasonic analyzer 120 during the welding or a certain amount of time passes after the application of the welding current is terminated.

In addition, the control module 136 may check detection of the LPD and the EOM to determine welding quality by receiving the B-SCAN image from the ultrasonic analyzer 120 during the welding operation. At this time, if the LPD and the EOM are detected and criteria on the material and the thickness of panels are met, welding quality requirement is considered to be satisfied.

Meanwhile, the welding control method using the adaptive control algorithm will be described based on the configuration of the welding control system 100 according to the exemplary embodiment of the present disclosure described above.

Figure 8:
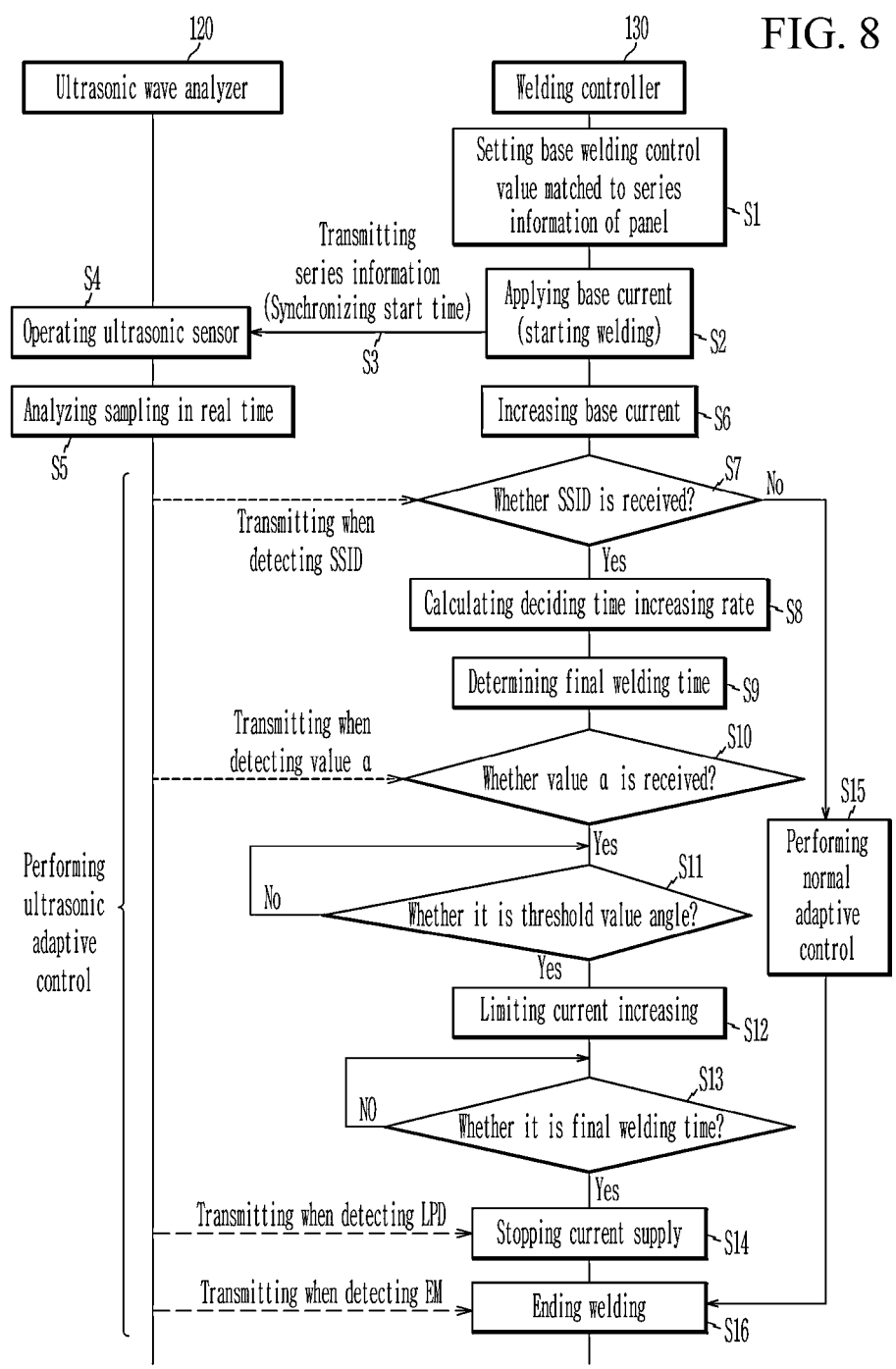
FIG. 8 is a flow chart briefly showing a welding control method according to an exemplary embodiment of the present disclosure.

FIG. 8 is a flow chart briefly showing the welding control method according to an exemplary embodiment of the present disclosure.

The welding control method according to the exemplary embodiment of the present disclosure is illustrated with a flow in which the ultrasonic analyzer 120 and the welding controller 130 exchange information. Through this flow, the welding control system 100 may be described in more detail. In addition, for convenience of explanation, it may be described with reference to the scenarios in FIG. 6 and FIG. 7.

Referring to FIG. 8, the welding controller 130 identifies the serial information of the panels P1 and P2 loaded by the conveyor and sets the base welding control parameters matched with the serial information at step S1. The welding controller 130 may identify the task information allocated by the server 200 and the ID of the loaded vehicle body in order to determine the serial information of the panels applied to the vehicle's body.

The welding controller 130 starts the welding by moving the welding gun 10 to the spot welds on the panels and applying the base current, set according to the base welding control parameters at step S2. At the same time, the welding controller 130 performs synchronization of the welding start time by transmitting the serial information to the ultrasonic analyzer 120 at step S3.

At this time, the ultrasonic analyzer 120 operates the ultrasonic sensor 110 by using the serial information received by the welding controller 130 as a trigger signal at step S4. The ultrasonic analyzer 120 may generate the ultrasonic waves of the band frequency considering the material and the thickness of the panels according to the serial information. Thereafter, the ultrasonic analyzer 120 may transmit the ultrasonic analysis information in real time at step S5. Here, the ultrasonic analysis information such as the SSID, the α, the LPD, and the EOM may be detected or not depending on the welding status of the welding part or sensitivity of detection conditions.

Meanwhile, when the predetermined current increase start time (30 ms) has passed since the welding start time, the welding controller 130 starts to increase the current by the set base current increase rate (e.g. 10%) at step S6.

When the welding controller 130 receives the SSID detected by the ultrasonic analyzer 120 ('Yes' at step S7), the time increase rate (105%) at the time of receiving the SSID is identified as illustrated in FIG. 7, showing the welding time control graph A at step S8.

The welding controller 130 determines the compensated final welding time (210 ms) by multiplying the set base welding time (200 ms) by the determined time increase rate (105%) at step S9. That is, the welding control time changes so that the current increase may continue according to the base current increase rate (e.g. 10%) for the final welding time (210 ms), which is increased from the base welding time (200 ms).

The welding controller 130 receives the α detected by the ultrasonic analyzer 120 ('Yes' at the step S7), and when the received α reaches the predetermined threshold angle ('Yes' at step S11), the current increase is limited (suspended) and the present increased current is determined as the maximum current at step S12. Here, the α reaching the predetermined threshold angle represents sufficient melting, and an excessive increase of the current may lead to generation of the spatter, thereby limiting the current according to the adaptive control algorithm.

The welding controller 130 controls the welding current to maintain the maximum current without increasing the current ('No' at step S13) until the final welding time is reached after passing the remaining welding time (70 ms) and, upon reaching the final welding time ('Yes' at step S13), suspends current supply to the welding gun 10 at step S14. However, an exemplary embodiment of the present disclosure is not limited thereto, and the welding controller 130 may immediately stop the current supply to the welding gun 10 when the LPD is received, detected by the ultrasonic analyzer 120, and determines that the received LPD satisfies the welding quality requirement at the step S14.

The welding controller 130 terminates the welding by releasing the welding force of the electrodes 11 and 12 acting on the panels P1 and P2 after the predetermined time elapses from the suspension of the current supply at step S16. However, an exemplary embodiment of the present disclosure is not limited thereto, and the welding controller 130 may immediately terminate the current supply to the welding gun 10 when the EOM is received, detected by the ultrasonic analyzer 120 at the step S16.

Meanwhile, when the SSID is not received at the step S7 ('No' at the step S7) or the α is not received at the step S10 ('No' at the step S10), the welding controller 130 may not perform the ultrasonic adaptive algorithm corresponding to each step, but perform a normal adaptive control according to the base welding control parameters and then terminates the welding operation at the steps S15 and S16.

Then, although omitted in FIG. 8, the welding controller 130 may receive the B-SCAN image from the ultrasonic analyzer 120 according to the welding control, match the ultrasonic analysis information of the B-SCAN image with the ultrasonic adaptive control information to build the database in the storage module 35, and determine the adequacy of the welding quality and the welding control.

In addition, the welding controller 130 operates the welding gun 10 and repeats the welding control process until the completion of welding operations for all spot welds included in the welding information.

As described above, according to the exemplary embodiment of the present disclosure, the welding control method may have an effect of preventing defective welding and contribute to manufacturing products of good welding quality by compensating the welding time and the current using the adaptive control algorithm for the panels after receiving the ultrasonic analysis information of a welding part in real time.

In addition, the welding control method may limit an excessive current increase by means of ultrasonic monitoring of the α, which represents the heat value of the panels, thereby preventing generation of spatter.

An exemplary embodiment of the present disclosure may not only be implemented through the apparatus and/or the method described above, but also through a program for implementing a function corresponding to the configuration of an embodiment of the present disclosure, or a medium in which programs are recorded, and such implementation may be easily achieved by a person skilled in the art based on the exemplary embodiment described above.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A system for regulating welding parameters of a spot welding machine joining a plurality of panels, the system comprising:
an ultrasonic sensor installed inside an electrode of a welding gun, applying a ultrasonic wave to a welding part of the panel, and detecting a reflected ultrasonic signal;
an ultrasonic analyzer that creates ultrasonic analysis information by analyzing in real time the ultrasonic signal; and
a welding controller receiving the ultrasonic analysis information from the ultrasonic analyzer, performing adaptive welding control with the welding parameters set based on information of the plurality of panels, and compensating in real time one or more welding parameters according to the received ultrasonic analysis information, wherein the welding controller comprises:
a communication module for communicating with a manufacturing execution system server, which centrally manages the ultrasonic analyzer and welding operation through a multi-channel communication interface;
an information collection module analyzing a message type and a receiving time of the ultrasonic analysis information received by the ultrasonic analyzer;
a timer module for performing time division-based counting in milliseconds (ms) during the welding operation;
a current conversion module of converting the current for the spot welding according to a signal applied;
a storage module storing at least one program and setting data for welding control and storing information generated according to the welding operation; and
a control module obtaining the information of the loaded panel, transmitting the information of the loaded panel to the ultrasonic analyzer, setting the welding parameters according to the information of the panel, and then starting the welding operation.

2. The system of claim 1, wherein the ultrasonic analyzer generates the ultrasonic wave with a frequency band selected based on the information of the panel received from the welding controller in order to perform ultrasonic analysis on the welding part.

3. The system of claim 2, wherein the ultrasonic analyzer detects at least one of a steel to steel interface (SSI), a steel to steel interface disappearance (SSID), a welding heat of a welding part (α), a liquid penetration depth (LPD), and an end of melting (EOM) as the ultrasonic analysis information based on the ultrasonic signal transmitted in real time.

4. The system of claim 3, wherein the ultrasonic analyzer generates an ultrasonic image, performs the ultrasonic analysis from a welding start time to a welding end time so as to obtain the ultrasonic analysis information, and transmits the obtained ultrasonic analysis information to the welding controller.

5. The system of claim 1, wherein the welding parameters include a welding time and a current.

6. The system of claim 1, wherein the welding controller controls a compensation of the welding time and the current with factors of the ultrasonic analysis information which is sequentially analyzed so as to ensure welding quality.

7. The system of claim 1, wherein the information collection module transmits to the control module the receiving time of the ultrasonic analysis information, time-divided in milliseconds (ms), from the welding start time to the welding end time.

8. The system of claim 1, wherein the setting data includes a location information of a spot weld and base welding control parameters, which are set variably for materials and thickness of the panels according to a serial information of the panels.

9. The system of claim 1, wherein the control module is capable of storing a kinematic position control information for the welding operation of a robot equipped with the welding gun, and controlling motion and operation of the welding gun through a position control of the robot according to each set operation.

10. The system of claim 1, wherein the control module sets the welding parameters, which include a base current at the welding start time, a base current increase rate, a current increase start time, a current increase end time, a base welding time at the welding start time, a maximum welding time, a time increase start time, and a time increase end time.

11. The system of claim 10, wherein the control module determines a total welding time based on the base welding time, the time increase rate at a time of receiving the SSID, and the information of the panel.

12. The system of claim 11, wherein the control module limits a current increase according to the $\alpha$ of the received ultrasonic analysis information, and stop the welding operation upon reaching the total welding time.

13. The system of claim 10, wherein the control module stops current supply when the LPD received from the ultrasonic analyzer meets a reference size according to the information of the panel.

14. The system of claim 10, wherein the control module terminates the welding by releasing a welding force of the electrode acting on the panel when the EOM is received by the ultrasonic analyzer.

15. A welding control method for joining a plurality of panels with a welding control system of a spot welding machine, the method comprises:
- step (a) for setting base welding parameters matched with a serial information of a panel and starting a welding based on the set base welding parameters;
- step (b) for monitoring an ultrasonic analysis information in real time by using an ultrasonic sensor installed inside an electrode of a welding gun;
- step (c) for starting to increase a current according to a set base current increase rate upon reaching a predetermined current increase start time from a welding start time;
- step (d) for identifying a time increase rate, which corresponds to a time of receiving a steel to steel interface disappearance (SSID) as the ultrasonic analysis information, and for determining a final welding time based on the set base welding time and the time increase rate; and
- step (e) for limiting the current increase when a welding heat of a welding part ($\alpha$), received as the ultrasonic analysis information, reaches a predetermined threshold angle and for maintaining a present current as a maximum current for a remaining welding time before terminating the welding.

16. The method of claim 15, wherein the step (b) includes a step for transmitting the serial information to an ultrasonic analyzer upon starting the welding in order to synchronize an ultrasonic wave generation time, and for generating an ultrasonic wave with a frequency band corresponding to an information of the panel.

17. The method of claim 15, wherein the step (e) includes a step for calculating the remaining welding time based on the final welding time and a receiving time of the $\alpha$.

18. The method of claim 15, wherein the step (e) includes a step for terminating the current supply to the welding gun based on a determination that a liquid penetration depth (LPD), received as the ultrasonic analysis information, meets a welding quality requirement; and
a step for releasing a welding force of the electrode acting on the panel upon receiving an end of melting (EOM) as the ultrasonic analysis information in order to terminate the welding.

19. The method of claim 15, further including, after the step (e), a step for receiving an ultrasonic image analyzed according to the welding control from the ultrasonic analyzer, for matching the ultrasonic analysis information with an ultrasonic adaptive control information to build a database, and for verifying the welding quality.

* * * * *